US008760535B2

United States Patent
Goel (10) Patent No.: US 8,760,535 B2
(45) Date of Patent: Jun. 24, 2014

(54) REDUCING COMPUTATIONAL COMPLEXITY IN DETERMINING AN ILLUMINANT OF A SCENE

(75) Inventor: Anurag Goel, Haryana (IN)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 12/651,104

(22) Filed: Dec. 31, 2009

(65) Prior Publication Data

US 2010/0103289 A1   Apr. 29, 2010

Related U.S. Application Data

(62) Division of application No. 11/757,409, filed on Jun. 4, 2007.

(51) Int. Cl.
*H04N 9/73* (2006.01)

(52) U.S. Cl.
USPC ....................................................... 348/223.1

(58) Field of Classification Search
USPC ................. 348/223.1, 655; 358/516; 382/167
See application file for complete search history.

(56) References Cited

U.S. PATENT DOCUMENTS

| | | | |
|---|---|---|---|
| 3,904,818 A | 9/1975 | Kovac | |
| 4,253,120 A | 2/1981 | Levine | |
| 4,642,684 A | 2/1987 | Alkofer | |
| 4,739,495 A | 4/1988 | Levine | |
| 4,920,428 A | 4/1990 | Lin et al. | |
| 5,446,831 A | 8/1995 | Yamashita et al. | |
| 5,652,621 A | 7/1997 | Adams, Jr. et al. | |
| 5,667,944 A | 9/1997 | Reem et al. | |
| 5,850,470 A | 12/1998 | Kung et al. | |
| 6,038,339 A | 3/2000 | Hubel et al. | |
| 6,377,702 B1 | 4/2002 | Cooper | |
| 6,573,932 B1 | 6/2003 | Adams, Jr. et al. | |
| 6,683,643 B1 | 1/2004 | Takayama et al. | |
| 6,724,422 B1 | 4/2004 | Werner | |
| 6,724,932 B1 | 4/2004 | Ito | |
| 6,785,814 B1 | 8/2004 | Usami et al. | |
| 6,873,727 B2 | 3/2005 | Lopez et al. | |

(Continued)

FOREIGN PATENT DOCUMENTS

| | | |
|---|---|---|
| CN | 1275870 | 12/2000 |
| WO | 2004063989 | 7/2004 |

OTHER PUBLICATIONS

Graham D. Finlayson, Steven D. Hordley, and Paul M. Hubel, "Color by Correlation: A Simple, Unifying Framework for Color Constancy", IEEE Transactions on Pattern Analysis and Machine Intelligence, Nov. 2001, pp. 1209-1221, vol. 23, No. 11.

(Continued)

*Primary Examiner* — Sinh Tran
*Assistant Examiner* — Christopher K Peterson (57) ABSTRACT

In an embodiment, computational complexity of estimating the actual illuminant of a scene is reduced by examining only a subset of the pixel values generated for a received image frame. In another embodiment, number of rotations of color values is minimized by selecting an area which contains the color cue values of a color in an original/unrotated coordinate space and has boundaries which parallel the axis of the original coordinate space, and rotating a color value only if the color value is within the selected area. In another embodiment, such an area is used in conjunction with a histogram-based approach to determine the actual illuminant.

4 Claims, 10 Drawing Sheets

(56) References Cited

U.S. PATENT DOCUMENTS

| | | | |
|---|---|---|---|
| 6,900,836 B2 | 5/2005 | Hamilton, Jr. | |
| 6,992,709 B1 | 1/2006 | Raj et al. | |
| 7,009,639 B1 | 3/2006 | Une et al. | |
| 7,092,018 B1 | 8/2006 | Watanabe | |
| 7,133,072 B2 | 11/2006 | Harada | |
| 7,184,080 B2 | 2/2007 | Kehtarnavaz et al. | |
| 7,277,575 B2 | 10/2007 | Baqai et al. | |
| 7,305,148 B2 | 12/2007 | Spampinato et al. | |
| 7,352,894 B2 | 4/2008 | Dolan et al. | |
| 7,450,160 B2 * | 11/2008 | Takahashi et al. | 348/223.1 |
| 7,486,844 B2 | 2/2009 | Chang et al. | |
| 7,502,505 B2 | 3/2009 | Malvar et al. | |
| 7,522,767 B2 | 4/2009 | Baker et al. | |
| 7,542,077 B2 * | 6/2009 | Miki | 348/223.1 |
| 7,551,207 B2 | 6/2009 | Yuyama | |
| 7,576,797 B2 | 8/2009 | Kehtarnavaz et al. | |
| 7,593,043 B2 * | 9/2009 | Uezono | 348/222.1 |
| 7,616,810 B2 | 11/2009 | Dolan et al. | |
| 7,630,107 B2 * | 12/2009 | Ichikawa et al. | 358/516 |
| 7,643,068 B2 * | 1/2010 | Hyodo | 348/223.1 |
| 7,671,910 B2 | 3/2010 | Lee | |
| 7,705,892 B2 * | 4/2010 | Uezono | 348/223.1 |
| 7,830,419 B2 * | 11/2010 | Sakurai | 348/223.1 |
| 7,885,458 B1 | 2/2011 | Lin | |
| 8,564,687 B2 | 10/2013 | Goel et al. | |
| 2002/0015111 A1 | 2/2002 | Harada | |
| 2002/0044778 A1 | 4/2002 | Suzuki | |
| 2002/0080245 A1 | 6/2002 | Parulski et al. | |
| 2002/0105579 A1 | 8/2002 | Levine et al. | |
| 2002/0118967 A1 | 8/2002 | Funston | |
| 2002/0167596 A1 * | 11/2002 | Suzuki et al. | 348/223.1 |
| 2002/0167602 A1 | 11/2002 | Nguyen | |
| 2003/0007076 A1 | 1/2003 | Okisu et al. | |
| 2003/0052978 A1 | 3/2003 | Kehtarnavaz et al. | |
| 2003/0194125 A1 | 10/2003 | Hubel et al. | |
| 2003/0222995 A1 | 12/2003 | Kaplinsky et al. | |
| 2004/0001234 A1 | 1/2004 | Curry et al. | |
| 2004/0032516 A1 | 2/2004 | Kakarala | |
| 2004/0120572 A1 | 6/2004 | Luo et al. | |
| 2005/0069201 A1 | 3/2005 | Speigle et al. | |
| 2005/0238225 A1 | 10/2005 | Jo et al. | |
| 2005/0248671 A1 | 11/2005 | Schweng | |
| 2005/0264658 A1 | 12/2005 | Ray et al. | |
| 2006/0103728 A1 | 5/2006 | Ishigami et al. | |
| 2006/0159336 A1 * | 7/2006 | Uezono | 382/167 |
| 2006/0170789 A1 * | 8/2006 | Takahashi et al. | 348/223.1 |
| 2006/0176375 A1 | 8/2006 | Hwang et al. | |
| 2006/0232684 A1 * | 10/2006 | Miki | 348/223.1 |
| 2006/0284991 A1 * | 12/2006 | Ikeda | 348/223.1 |
| 2007/0002150 A1 * | 1/2007 | Abe | 348/223.1 |
| 2007/0024719 A1 * | 2/2007 | Sakurai | 348/223.1 |
| 2007/0091188 A1 | 4/2007 | Chen et al. | |
| 2007/0132966 A1 | 6/2007 | Widdowson et al. | |
| 2007/0139532 A1 | 6/2007 | Sakurai | |
| 2007/0165113 A1 * | 7/2007 | Suzuki | 348/223.1 |
| 2007/0229676 A1 * | 10/2007 | Tanaka et al. | 348/223.1 |
| 2007/0247532 A1 | 10/2007 | Sasaki | |
| 2008/0143844 A1 | 6/2008 | Innocent | |
| 2008/0259186 A1 | 10/2008 | Wang et al. | |
| 2008/0278601 A1 | 11/2008 | Goel et al. | |
| 2008/0297620 A1 | 12/2008 | Goel | |
| 2009/0010539 A1 | 1/2009 | Guarnera et al. | |
| 2009/0116750 A1 | 5/2009 | Lee et al. | |
| 2010/0103289 A1 | 4/2010 | Goel | |

OTHER PUBLICATIONS

Kuno et al. "New Interpolation Method Using Discriminated Color Correlation for Digital Still Cameras" IEEE Transac. On Consumer Electronics, vol. 45, No. 1, Feb. 1999, pp. 259-267.

Weerasinghe et al.; "Method of Color Interpolation in a Single Sensor Color Camera Using Green Channel Separation"; Visual Information Processing lab, Motorola Australian Research Center; IV 3233-IV3236.

* cited by examiner

REDUCING COMPUTATIONAL COMPLEXITY IN DETERMINING AN ILLUMINANT OF A SCENE

This application is a Divisional Application of U.S. patent application Ser. No. 11/757,409 filed on Jun. 4, 2007, which is incorporated herein in its entirety.

BACKGROUND

1. Field of Disclosure

The present disclosure relates generally to image processing in image capture devices such as video cameras and still cameras, and more specifically to reducing computational complexity in determining an illuminant of a scene in such devices.

2. Related Art

A scene refers to any area/object, the image of which is sought to be captured using an image capture device. An image capture device (ICD) in turn refers to a device such as a still camera or a video camera which is designed to receive light signals from a scene and represent the corresponding image in a suitable format (analog or digital).

In general, light ("incident light") originating from a light source (e.g., Sun, light bulb, reflection from an object) is incident on a scene, and emanates from the scene due to interactions with the objects present in the scene. The interactions include acts such as reflection, absorption, dispersion, diffraction, etc., as is well known in the arts. Some times, a light source itself may be part of a scene. The light ("received light") from the scene is eventually received at an ICD and the image of the scene is captured as an image frame.

The nature of incident light generally depends on various factors such as any intervening medium (e.g., clouds, glass) present between a light source and a scene, the colors and their brightness with which the light source/light sources generate light, etc. Incident light generally is a combination of different colors of same/different brightness. Thus, the incident light has brighter characteristics on clear-sky days in comparison to cloudy situations.

The general type of light incident on a scene is referred to as an illuminant, which is typically dependent on the light source/light sources as well as the factors noted above. Such illuminant is henceforth referred to as "actual illuminant" to differentiate from "potential illuminants" described in the sections below.

There is often a need to determine an actual illuminant of a scene by examining the image of a scene. For example, in an ICD, there are various corrections that may need to be performed based on a determination of actual illuminant. Auto-white balance (AWB) correction is one such example.

As is well known in the relevant arts, AWB correction generally refers to a color correction that may need to be performed on image representation, with the nature of correction depending on the actual illuminant. Often the AWB correction parallels the correction that human eye often performs depending on different illuminants based on which light is received.

One approach to determining an actual illuminant is to store (in an ICD) data representing how a color in a scene would be represented (in the received light) under various illuminants (pre calibrated colors called as reference colors), and comparing the image content for match with these reference colors. Such approaches often require substantial processing resources.

In general, there is a need to reduce the computational complexity (or resource requirements, in general) in determining the actual illuminants, without possibly compromising accuracy at least substantially.

In general, there is a need to reduce the computational complexity (or resource requirements, in general) in determining the actual illuminants.

BRIEF DESCRIPTION OF THE DRAWINGS

Example embodiments will be described with reference to the following accompanying drawings, which are described briefly below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

An aspect of the present invention determines an actual illuminant from multiple illuminants by comparing only a subset of color values (respectively representing the corresponding pixels) of an image frame with information representing how each detectable color manifests under different illuminants. Due to the comparison of only a subset of the color values, the computational requirements are reduced.

Another aspect of the present invention forms an area covering the cue values of a set of (one or more) detectable colors (for respective illuminants), and checks whether a color value is within the area before checking whether the color value matches any of the detectable colors. In an embodiment, the area is chosen to have a set of boundary lines, which parallel the axis defining different chromaticity values in a first coordinate space. To check for a match with a detectable color, each color value may be rotated to a new coordinate axis in which the boundaries of the cue information for a detectable color are parallel to the axis of the new coordinate space.

Due to the use of the area, some of the unneeded rotations of color values (to the new coordinate space) may be avoided.

One more aspect of the present invention applies similar concept of an area when using a histogram approach to determining the actual illuminant. In the histogram based approach, the frequency of occurrence of each color candidates in the chromaticity space are determined. An area covering the cue values (of a detectable color) with the boundaries being in parallel to the axis of the coordinate space (in unrotated coordinate space, i.e., the same space as in which the color values are received), is formed. Only the color candidates (and their frequency counts) falling within such an area are then used to determine the level of match for the detectable color.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well known structures or operations are not shown in detail to avoid obscuring the features of the invention.

2. Image Capture Device (Camera)

Figure 1:
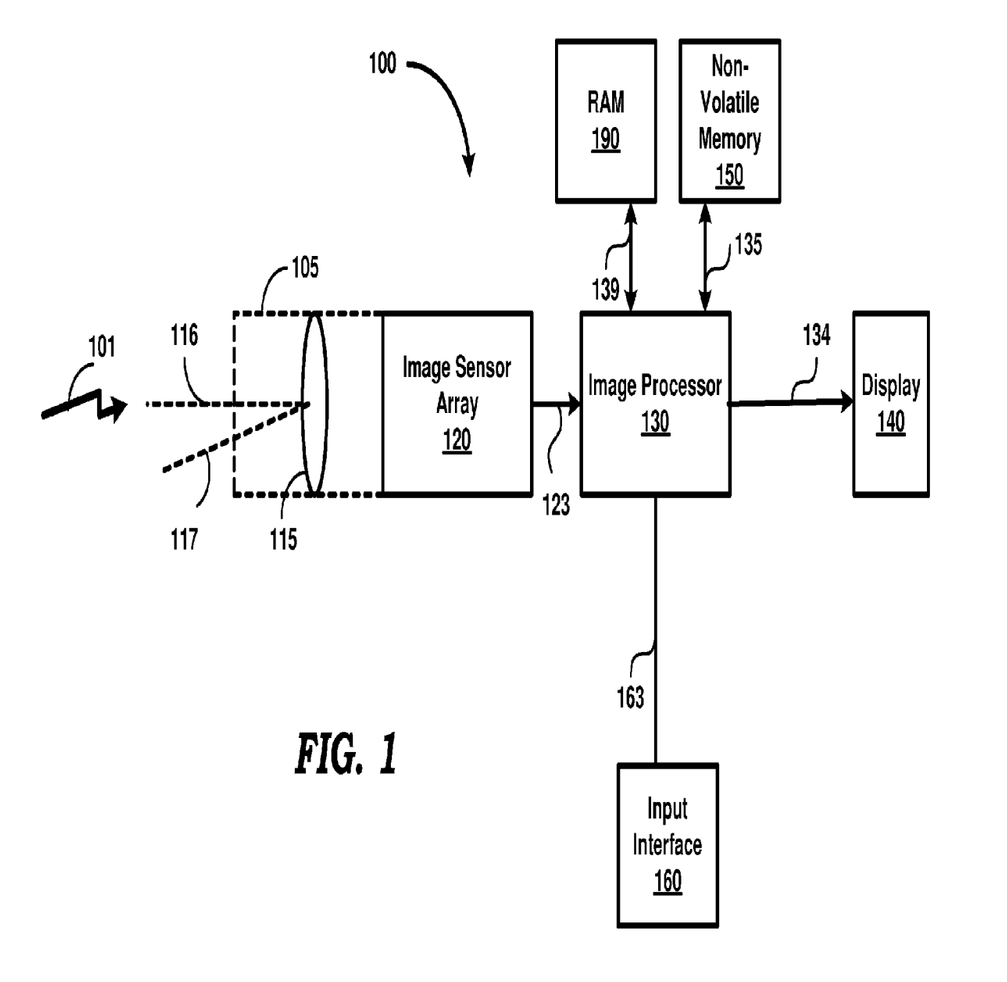
FIG. 1 is a block diagram of an image capture device (ICD) illustrating an example embodiment in which several aspects of the present invention may be implemented.

FIG. 1 is a block diagram of an image capture device, in this example a camera, illustrating an example embodiment in which several aspects of the present invention may be implemented. Camera 100 is shown containing lens enclosure 105, lens assembly 115, image sensor array 120, image processor 130, display 140, non-volatile memory 150, input (I/P) interface 160 and RAM 190. Only the components as pertinent to an understanding of the operation of the example embodiment are included and described, for conciseness and ease of understanding. Each component of FIG. 1 is described in detail below.

Lens enclosure 105 (denoted by dotted lines) is shown housing lens assembly 115 and image sensor array 120, and is generally designed to shield extraneous (i.e., other than the light being received via the lens assembly) light from being incident on image sensor array 120 (in general, capturing medium). Lens assembly 115 may contain one or more lenses, which can be configured to focus light rays (denoted by arrow 101) from a scene to impinge on image sensor array 120.

Image sensor array 120 may contain an array of sensors, with each sensor generating an output value representing the corresponding point (small portion or pixel) of the image, and proportionate to the amount of light that is allowed to fall on the sensor. The output of each sensor is converted to a corresponding digital value (for example, in RGB format). The digital values, produced by the sensors are forwarded on path 123 to image processor 130 for further processing.

Display 140 displays an image frame in response to the corresponding display signals received from image processor 130 on path 134. Display 140 may also receive various control signals (not shown) from image processor 130 indicating, for example, which image frame is to be displayed, the pixel resolution to be used etc. Display 140 may also contain memory internally for temporary storage of pixel values for image refresh purposes, and is implemented in an embodiment to include an LCD display.

Input interface 160 provides a user with the facility to provide inputs, for example, to select features such as whether auto-white balance (AWB) correction is to be enabled/disabled. The AWB correction may be performed only if the feature is enabled. The user may be provided the facility of any additional inputs, as described in sections below.

RAM 190 stores program (instructions) and/or data used by image processor 130. Specifically, pixel values that are to be processed and/or to be used later, may be stored in RAM 190 via path 139 by image processor 130.

Non-volatile memory 150 stores image frames received from image processor 130 via path 135. The image frames may be retrieved from non-volatile memory 150 by image processor 130 and provided to display 140 for display. In an embodiment, non-volatile memory 150 is implemented as a flash memory. Alternatively, non-volatile memory 150 may be implemented as a removable plug-in card, thus allowing a user to move the captured images to another system for viewing or processing or to use other instances of plug-in cards.

Non-volatile memory 150 may contain an additional memory unit (e.g. ROM, EEPROM, etc.), which store various instructions, which when executed by image processor 130 provide various features of the invention described herein. In general, such memory units (including RAMs, non-volatile memory, removable or not) from which instructions can be retrieved and executed by processors are referred to as a computer (or in general, machine) readable medium.

Image processor 130 forwards pixel values received on path 123 to path 134 to enable a user to view the scene presently pointed by the camera. Further, when the user 'clicks' a button (indicating intent to record the captured image on non-volatile memory 150), image processor 130 causes the pixel values representing the present (at the time of clicking) image to be stored in non-volatile memory 150.

It may be appreciated that the image frames thus captured may need to be corrected based on the illuminant of the scene captured, Auto-white balance (AWB) being one such correction. This requires the determination of the actual illuminant of the scene captured.

Image processor 130 may operate to determine the actual illuminant of a scene by comparing the stored color characteristics of a predetermined number of illuminants with the color characteristics of the captured image frame and identifying the closest match, according to several aspects of the present invention, and the description is accordingly continued with the internal details of image processor 130 in one embodiment.

3. Image Processor

Figure 2:
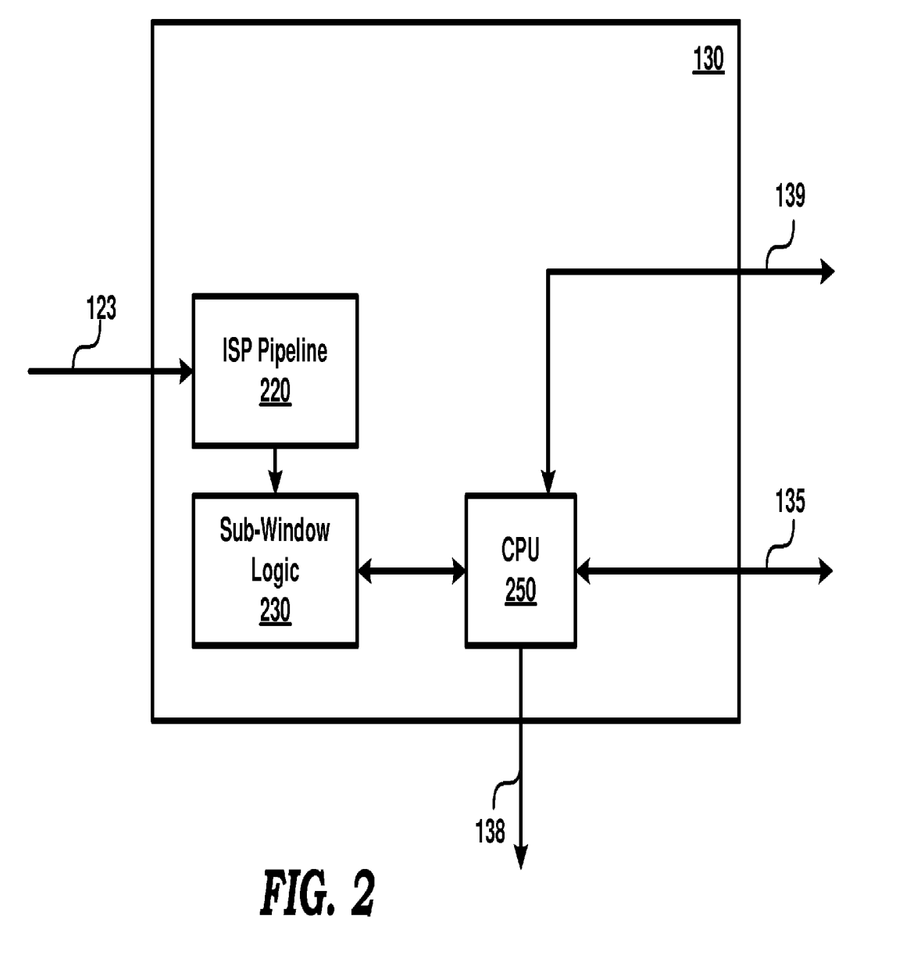
FIG. 2 is a block diagram of the internal details of an image processor operating to determine an illuminant of a scene in one embodiment.

FIG. 2 is a block diagram of image processor 130 in one embodiment. Merely for illustration, several features are described below with respect to the components of FIG. 2. However the features can be implemented in various other processors as well, without departing from the scope and spirit of several aspects of the present invention. Image processor 130 is shown containing image signal processor (ISP) pipeline 220, sub-window logic 230, and central processing unit (CPU) 250. Image processor 130 may contain other components/blocks also, but are not shown as not being relevant to an understanding of the described embodiment. Each component is described in detail below.

ISP pipeline 220 receives a stream of pixel values representing an entire image frame (row wise) on path 123. The pixel values may be received directly from image sensor array 120 (of FIG. 1). ISP pipeline 220 may be implemented as a shift register, and shifts in pixels received on path 123, and transfers the pixels to buffer registers or other internal buffer, from which CPU 250 may retrieve pixel values via sub-window logic 230. ISP pipeline 220 may perform various operations on the stored pixels such as optical black restoration (subtracting a black color reference level from each of the pixels), sensor linearization (which removes non-linear effects of image sensor array 120), white balance (either automatically or based on user inputs), color correction (transformation of pixel values from one color space to another specific color space), gamma correction, demosaicing (R/GB pixel signals obtained from Bayer color filter array converted to simultaneous R/G/B component values), etc.

Sub-window logic 230 receives control inputs from CPU 250 specifying dimensions and locations of one or more sub-windows (e.g., in the form of rectangular areas) in the captured image that are to be subsampled. For each of a group (for example, nine adjacent pixels) of pixel values in the sub-window, sub-window logic 230 computes the average of the pixel values in the group, and generates a corresponding single pixel value having the computed average value. The 'averaged' pixels thus generated form a subsampled version of portion of the image in the sub-window, and the sub-sampled version is provided by sub-window logic 230 to CPU 250. In an embodiment, sub-window logic 230 receives a 800.times.600 image frame, and generate a one pixel for each 8.times.8 pixel area. The resulting 100*75 image frame may be provided to CPU 250.

CPU 250 may operate on the subsampled image frame to determine an illuminant from a set of potential illuminants, providing the closest match to the illuminant of the scene, as described with examples, in detail below. Operation on such sub-sampled images reduces the computational requirements in CPU 250. Alternative embodiments can be implemented to operate in different ways (e.g., on the original image frame, without subsampling). Irrespective, CPU 250 may determine an illuminant from a set of potential illuminants, providing the closest match to the illuminant of the scene, by examining/processing the image data (either in subsampled form or otherwise), as described with examples below.

As noted above, in an embodiment, image processor 130 may operate to determine the actual illuminant of a scene by comparing the stored color characteristics of a predetermined number of potential illuminants with the color characteristics of the captured image frame and identifying the closest match. Some of the potential illuminants in an example embodiment are described below.

4. Potential Illuminants

Figure 3:
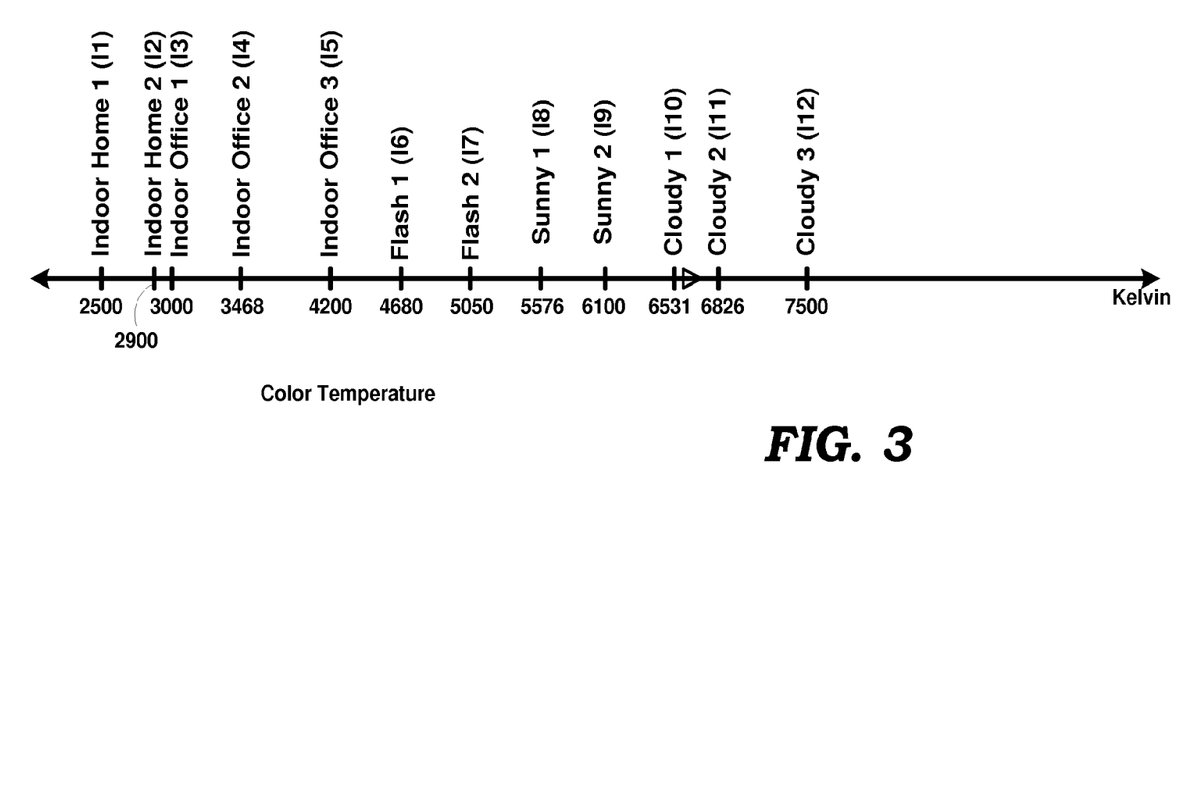
FIG. 3 depicts an example set of illuminants arranged according to their color temperature.

FIG. 3 is a graph showing some example illuminants and corresponding color temperatures. As is well known in the relevant arts, the temperature in degrees Kelvin at which the hue of the emissions from a heated black-body radiator matches the hue of an illuminant is that illuminant's color temperature. There are shown 12 illuminants, with respective color temperatures of 2500, 2900, 3000, 3468, 4200, 4680, 5050, 5576, 6100, 6531, 6826 and 7500 and identified respectively as Indoor Home 1, Indoor Home2, Indoor Office1, Indoor Office2, Indoor Office3, Flash1, Flash2, Sunny1, Sunny2, Cloudy1, Cloudy2, and Cloudy3. The illuminants are respectively labeled as I1 to I12 for ease of description.

It may be appreciated that some of the colors in a scene may not be detected in CPU 250 under certain illuminants. For example, when an image frame from a scene illuminated by a white illuminant (such as Sunlight) is received, all colors may be detected. On the other hand, when an illuminant has lower color temperature (more reddish hue) or higher color temperature (more bluish hue) than white light, some of the colors may have very little spectral power density. Accordingly, such colors may not be detected for the corresponding color temperatures.

While the examples herein are described with this set of illuminants and color temperatures merely for illustration, it may be appreciated that several features of the invention can be practiced with more or less illuminants with other color temperatures or other characteristics, etc., as will be apparent to one skilled in the relevant arts by reading the disclosure provided herein.

Thus, for each potential illuminant in the set of illuminants, data representing how each of the corresponding detectable colors appear when illuminated by that illuminant, is made available to the image processor in an ICD. In an embodiment, the set of colors comprise skin, green and white.

For illustration, it is assumed that all the set of three colors are detectable for each potential illuminant. Thus, determination of an actual illuminant may entail comparing the color values of the pixels in an image frame with 36 different sets of data (corresponding to 12 illuminants and 3 detectable colors). Such comparison and other related computations may cause excessive computational load. Several aspects of the present invention reduce the computational complexity in determining an illuminant of a scene, as described below with examples.

Figure 4:
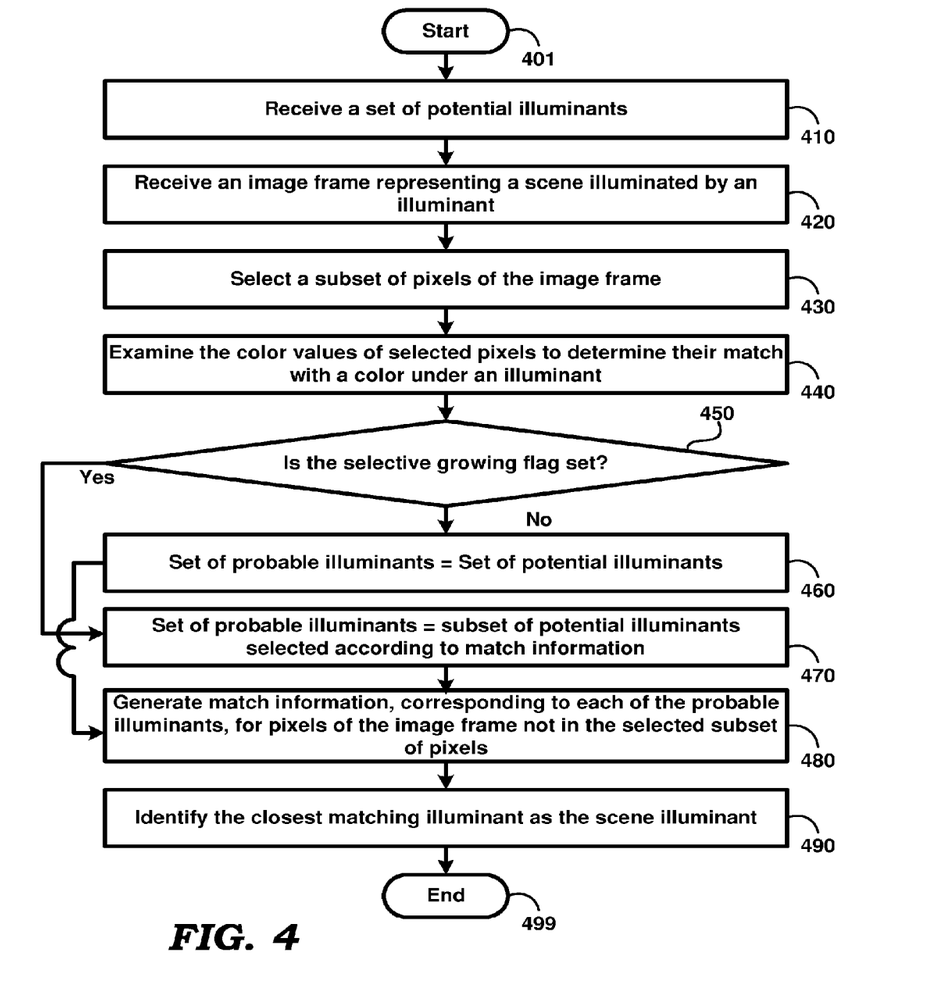
FIG. 4 is a flowchart illustrating the manner in which computational complexity in determining an illuminant of a scene is reduced in one embodiment.
Figure 5A:
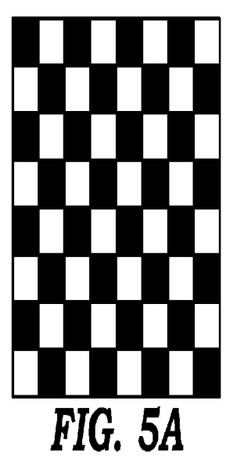
FIGS. 5A-5E respective fixed patterns used to select subset of pixels from a received image frame.
Figure 5B:
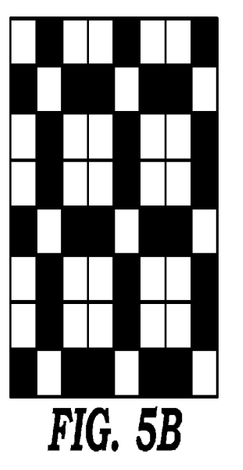
Figure 5C:
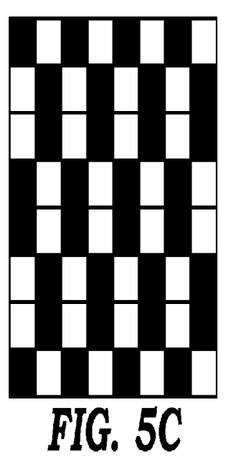
Figure 5D:
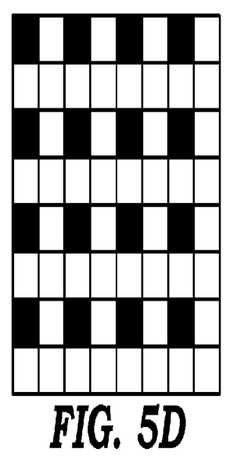
Figure 5E:
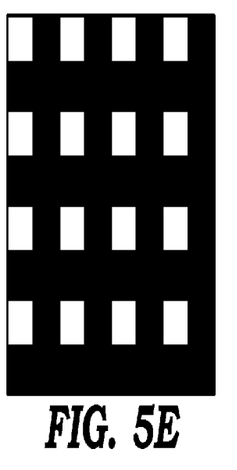

5. Reducing Computational Complexity in Determining an Illuminant of a Scene FIG. 4 is a flowchart illustrating the manner in which computational complexity is reduced in determining an illuminant of a scene in an embodiment. The flowchart is described with respect to FIGS. 1-3, merely for illustration. However, various features can be implemented in other environments and other components. Furthermore, the steps are described in a specific sequence merely for illustration.

Alternative embodiments in other environments, using other components, and different sequence of steps can also be implemented without departing from the scope and spirit of several aspects of the present invention, as will be apparent to one skilled in the relevant arts by reading the disclosure provided herein. The flowchart starts in step 401, in which control passes immediately to step 410.

In step 410, image processor 130 receives a set of illuminants. The set of illuminants may represent the illuminants likely to be encountered by target ICDs. In an embodiment, the set of illuminants consist of 12 illuminants described with respect to FIG. 3 above.

In step 420, image processor 130 receives an image frame representing a scene illuminated by an illuminant. The image frame may be received in the form of pixel values, with each pixel value indicating both color and intensity of the corresponding point (small portion of the image). In the description below, only the color values (in chromaticity space) are described as being used in determining an actual illuminant. However, alternative embodiments can be implemented using the intensity as well as color values in different representations, without departing from the scope and spirit of several aspects of the present invention.

In step 430, image processor 130 selects a subset of pixels of the image frame. The subset may be selected in specific portions of an image frame and/or according to a pattern with such portions. The patterns can be fixed or adaptive. An adaptive pattern can be generated by using area growing techniques. Some example patterns in case of fixed patterns are described in sections below. However, other approaches, as suited to the specific environments and requirements, may be used for selecting the subset without departing from the scope and spirit of several aspects of the present invention.

In step 440, image processor 130 examines the color values of selected pixels to determine their match with detectable color and potential illuminant combinations. As noted above, data representing how detectable colors would be represented when illuminated by corresponding potential illuminants, may be stored (or made available otherwise from externally or by appropriate logic) in the ICD. The set of detectable colors may be chosen such that they are likely to be present in a large proportion of the images captured by ICDs under normal use. Image processor 130 may then compare the color values of the selected pixels with the stored color values to conclude whether the specific pixel matches the color.

In step 450, image processor 130 checks whether a "selective growing flag" is set. The selective growing flag is used to decide whether all the potential illuminants are to be considered for identifying the closest matching illuminant of the scene or not. If the "selective growing flag" is set, control passes to step 470. Otherwise, control passes to step 460.

In step 460, image processor 130 assigns the set of potential illuminants received in step 410 as the set of probable illuminants. The set of probable illuminants represent the set of illuminants from which image processor 130 may identify the closest matching illuminant of the scene. As the "selective growing flag" was not set in step 450, all the potential illuminants will be considered for identifying the closest matching illuminant.

In step 470, image processor 130 selects a subset of the set of potential illuminants received in step 410 as the set of probable illuminants. The subset is selected to contain those illuminants from the set of potential illuminants which are likely to provide a close match to the illuminant of the scene. The subset is selected based on the match information determined in step 440. Factors such as the number/location of color values matching a detectable color, the extent to which the comparison is close, etc., may be considered in selecting the set of probable illuminants. Several approaches to such selection will be apparent to one skilled in the relevant arts by reading the disclosure provided herein.

In step 480, image processor 130 generates match information, corresponding to the each of probable illuminants, for pixels of the image frame not in the selected subset of pixels. In other words, the match information of step 440 is extrapolated to other positions (not considered in step 440). Such match information may be generated in a number of ways, at least some of which are described in sections below.

In step 490, image processor 130 identifies the closest matching illuminant as the scene illuminant based on the match information of step 480. Various factors such as the number/location of color values matching a detectable color, the extent to which the comparison is close, etc., may be considered in determining the closest matching illuminant. Several approaches to such identification will be apparent to one skilled in the relevant arts by reading the disclosure provided herein. The flowchart ends in step 499.

It should be appreciated that the features described above can be implemented in various embodiments. The description is continued with respect to example implementation of the above noted features.

6. Example Implementation Using a Subset of Pixels

As noted above with respect to step 410, a subset of the received pixels is first selected (within an area of a received frame). Example approaches to selection are depicted in FIGS. 5A-5E, and these represent fixed patterns. In each of the Figures, 8.times.8(=64) pixels of an image frame are shown, and the shaded area represents pixel values that are included in the subset and the white (non-shaded) areas represent pixel values that are not included. The patterns in FIGS. 5A-5E are respectively referred to as checker board pattern, modified checker board pattern1, modified checker board pattern2, sub-sampling by 2 pattern and inverse sub-sampling by 2 pattern.

Figure 6:
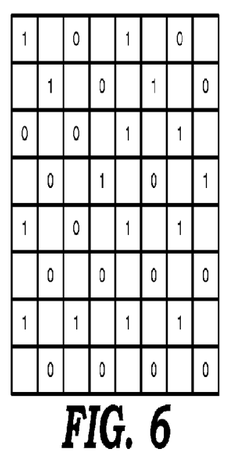
FIG. 6 is an example logical diagram showing the match information for a color generated from a subset of pixels in one embodiment.

The match information corresponding to step 440 may be represented as logically shown in FIG. 6. FIG. 6 corresponds to the match information generated from the pattern of FIG. 5A. In comparison to FIG. 5A, each shaded area of FIG. 6 is shown with a 0 (no match) or 1 (matched). The match value for each area may be generated in one of several known ways.

The match information thus generated is processed to determine the closest matching illuminant in step 490. In an embodiment, the non-shaded areas are ignored in determining the closest matching illuminant. Alternatively, various well known techniques such as area growing, dilation and propagation may be used in predicting the likely values of each white area (from the match information of the surrounding pixels) and to enhance the accuracy of the indications in shaded areas, and the resulting 8.times.8 values can then be used in determining the closest matching illuminant. Predicting the likely values of each white area can be done for all or a selected subset of potential illuminants.

The resulting 8.times.8 values may be referred to as a larger map, while the map formed (not shown) just by the shaded area is referred to as an original map. A pixel in the white area is generally set to 1 if the surrounding pixels (exceeding a pre-specified match count) are also set to 1, or else to 0. Alternatively if the color match count of surrounding pixels is greater than or equal to 1 and less than pre-specified count then the pixel of white area is examined for color match before being set as 1 or 0 in the larger map. Each of the bits of the original/larger map may be conveniently stored as a bit of a random access memory (RAM).

By using the subset of pixels in determining match information, the computational complexity is reduced. The reduction can be appreciated by appreciating the comparisons that may need to be performed in an embodiment. Accordingly, the description is continued to illustrate the comparisons needed in an example scenario.

7. Comparisons Required

Figure 7:
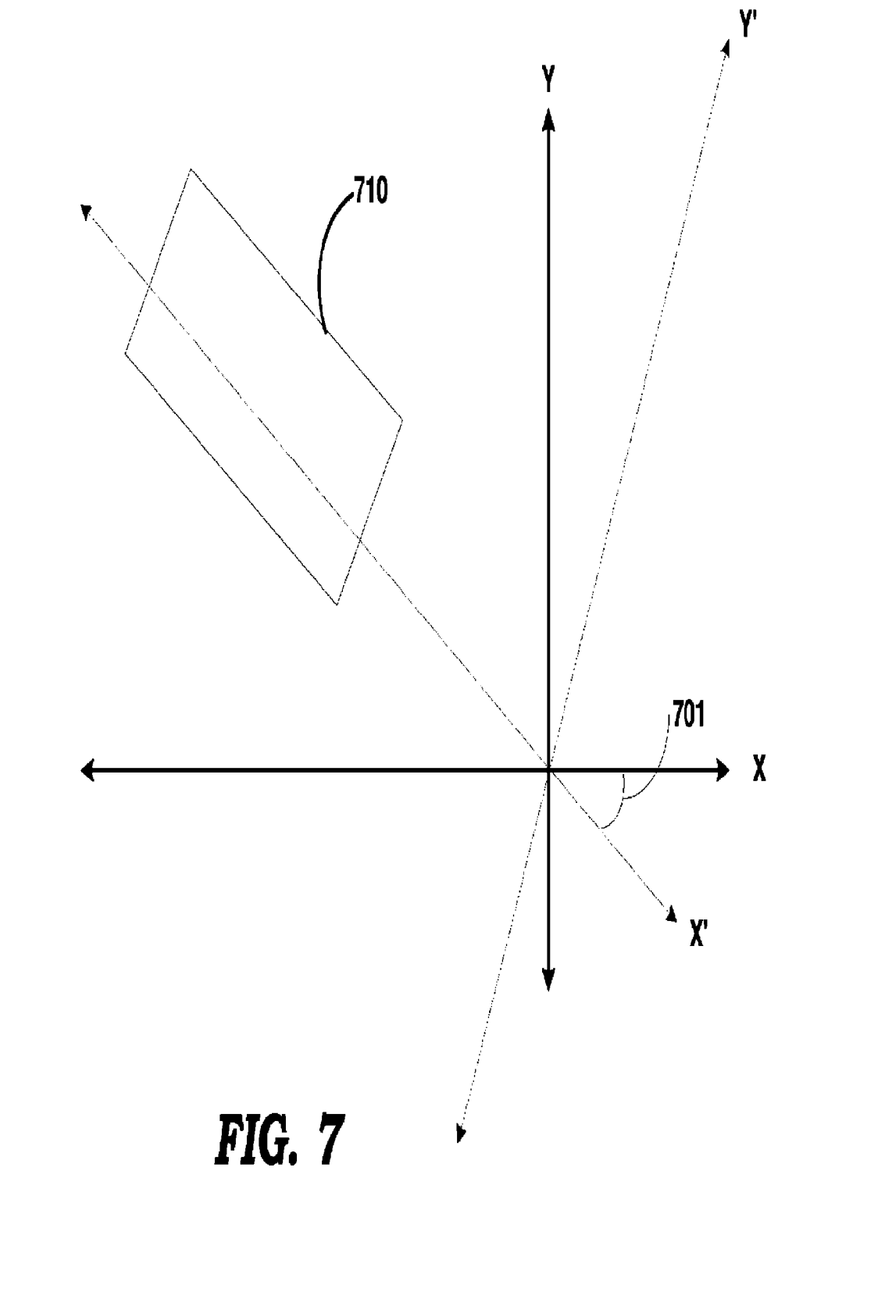
FIG. 7 is a graph containing a cue area of a detectable color illustrating the need for rotation of color values.

FIG. 7 is a graph containing the color cues of a detectable color, illustrating the manner in which a match of a color value (in a received frame) can be determined for a detectable color and potential illuminant combination. The graph is shown in containing Ky and Kx of chromaticity space (well known in the relevant arts) along the Y and X axis respectively.

The color cue values are assumed to be contained in rectangle 710 merely as an illustration. However, the color cue values can be modeled as any other shapes as suited in the specific environment. The area covering the color cue values is referred to as a cue area.

In general, a color value is deemed to match if the value falls in rectangle 710. The color value may be compared with each point in rectangle 710, but may consume substantial processing power. Alternatively, the color value may be checked against the boundaries, but there would be many of such points given that the boundaries of the rectangle are not aligned (in parallel to) with the X and Y axis.

To reduce the number of points for comparison on the boundaries, rectangle 710 may be mapped to a new coordinate space shown with new axis X' and Y'. X' and Y' are chosen to be parallel to the boundaries of rectangle 710. Accordingly, the values of each color cue in rectangle 710 needs to be also rotated. For the present purpose, given that the boundaries of the rotated rectangle are parallel to the new axis X' and Y', it may be sufficient to compute the values of the four corners of the rotated rectangle, and such rotated values may be stored in the ICD for determining the actual illuminant.

However, prior to checking with the boundaries of rectangle 710 in the new coordinate space (X' and Y' axis), a color value may also need to be rotated by the same angle (701). Though only a single rectangle (detectable color) is shown for illustration, many environments contain multiple detectable colors, and the corresponding rectangles (cue area, in general) may need be rotated by corresponding different degrees. Thus, each color value may also need to be rotated to corresponding degrees, before comparison with the corresponding rotated (in general, transformed) cue area.

Once rotated, the X' and Y' coordinates of the rotated color value can be compared with the X' and Y' coordinates of the boundaries of the rotated rectangle. A maximum of four comparisons may need to be performed to determine a match.

However, rotation of each color value is also computationally intensive (particularly given that there are multiple detectable colors and multiple potential illuminants) and it may be thus desirable to avoid rotations of color values. Several aspects of the present invention minimize such rotation as described with examples below.

8. Minimizing Unneeded Rotations

Figure 8:
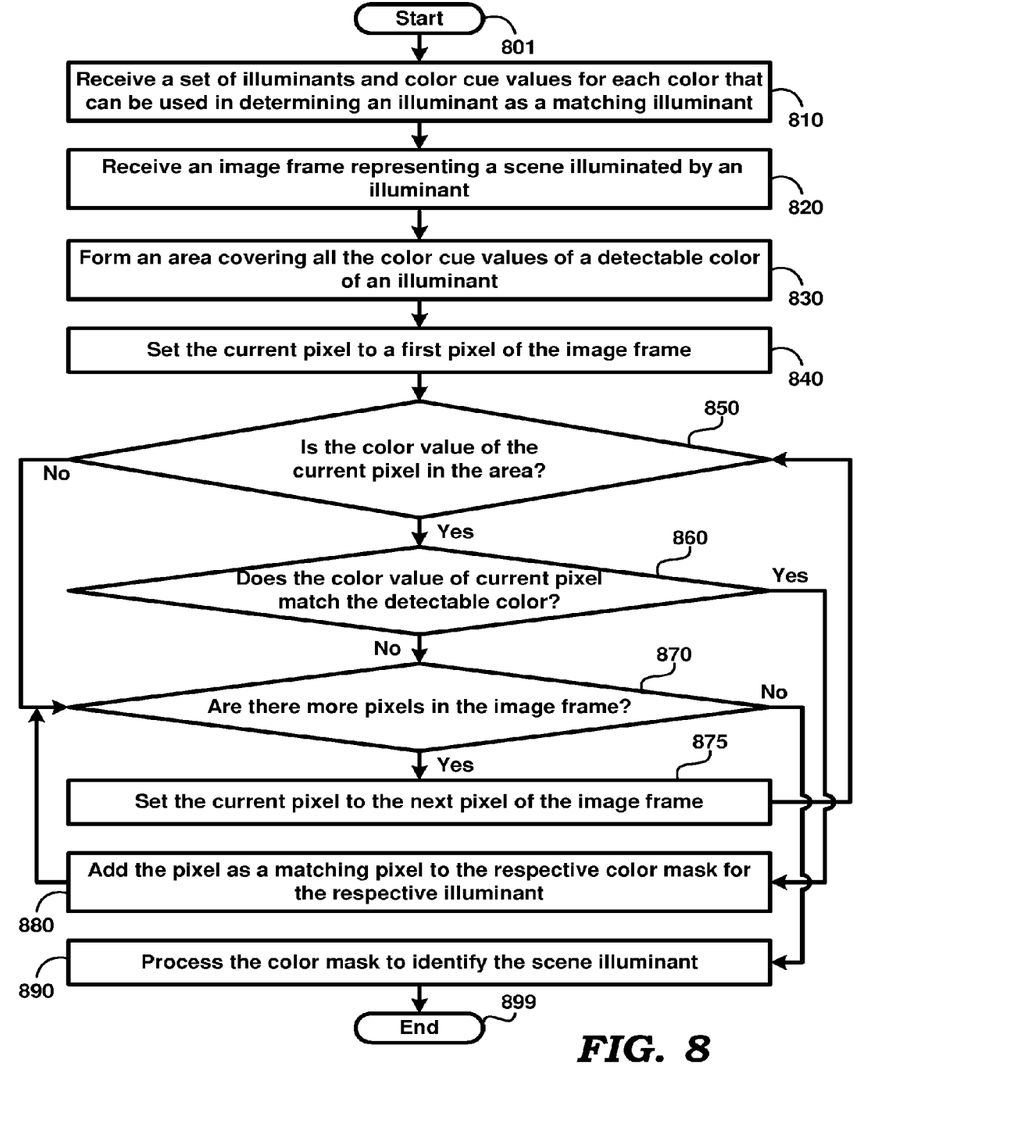
FIG. 8 is a flowchart illustrating the manner in which number of unneeded rotations of color values can be minimized in one embodiment.

FIG. 8 is a flowchart illustrating the manner in which unneeded rotation of color values can be minimized when operating in conjunction with the rotated cue areas in an embodiment. The description is provided with respect to FIGS. 1-3 and 7 merely for illustration. However, various features can be implemented in other environments (e.g., using the only the subset of pixels, instead of an entire image frame, as described with respect to FIG. 4 and/or using a subset of potential illuminants) and other components. Furthermore, the steps are described in a specific sequence merely for illustration.

Alternative embodiments in other environments, using other components, and different sequence of steps can also be implemented without departing from the scope and spirit of several aspects of the present invention, as will be apparent to one skilled in the relevant arts by reading the disclosure provided herein. The flowchart starts in step 801, in which control passes immediately to step 810.

In step 810, image processor 130 receives a set of illuminants and color cue data for each color that can be used in determining each illuminant as a matching illuminant. The color cue data may merely specify the four corners of the cue area in the rotated coordinate system (illustrated above) and the angle of rotation. The set of illuminants may represent the potential illuminants or a subset of these from which the closest matching illuminant may be determined, as described in step 410 and FIG. 3 before. As may be appreciated, the cue data indicates how detectable colors would be manifested when illuminated by corresponding potential illuminants, as noted above.

In step 820, image processor 130 receives an image frame representing a scene illuminated by an illuminant. Image processor 130 may use all the pixels in the frame or select a subset of pixels through techniques well known in the relevant arts, including those described before.

In step 830, image processor 130 forms an area in non-rotated coordinate space covering the color cue values of a color of an illuminant. The area may be advantageously chosen to cover the color cue values of potentially all detectable colors for all illuminants or it may be chosen to cover the color values of one or more detectable colors for one of more illuminants. The area can be defined using as many lines (or curves, as suited in the specific environment) as needed.

Figure 9:
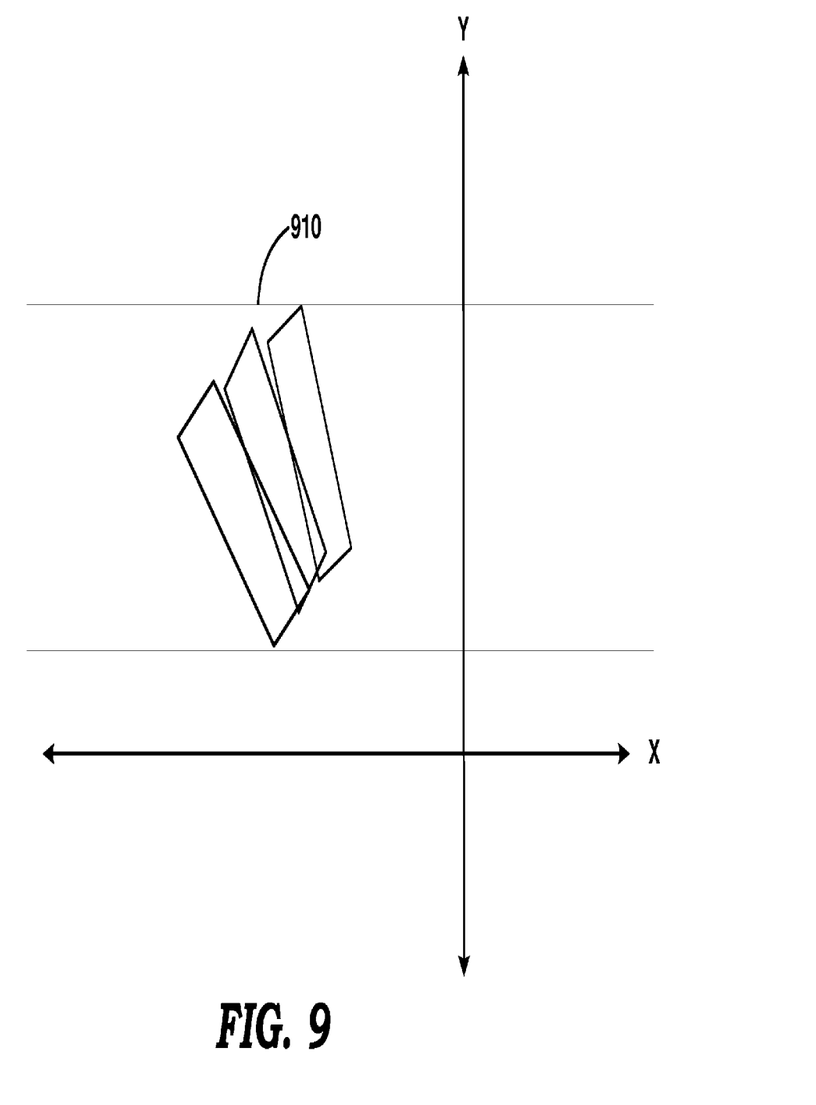
FIG. 9 is a graph depicting an area, which covers the cue areas of multiple detectable colors in non-rotated coordinate space in one embodiment.

In case of using a single line, all the color cue values lie on one side of the line (forming an area). In case of using two lines, the color cue values would lie (in an area formed) between the two lines. Each line may be chosen to be parallel to non-rotated axis X and Y, in addition to covering minimum area. As an illustration, FIG. 9 is shown containing rectangle 910 covering the cue data of three detectable colors, with each boundary line being parallel to one of the X and Y axis. In addition, the resulting rectangle has minimal area covering the cue areas.

In step 840, image processor 130 sets the current pixel to the first pixel of the image frame. The current pixel represents the pixel, which is currently being matched with detectable colors, the cues of which are covered by the area.

In step 850, image processor 130 checks whether the color value (in the non-rotated coordinate space) of the current pixel falls in the area formed in step 830. Assuming the boundaries of the area are parallel to the X/Y axis as shown in FIG. 9, the checking would take utmost 4 comparisons in case of a rectangle area.

If it falls in the area, there is a possibility that the color value matches a detectable color and hence may be processed further by transferring control to step 860. If it does not fall in the area, there is no likelihood of it matching a color and hence may be ignored and control passes to step 870.

In step 860, image processor 130 checks whether the color value of the current pixel matches a detectable color. Here, the color value may be rotated to the X', Y' coordinate space and then compared against the boundary coordinates of the rotated rectangle (cue area). If the rotated color value falls in the rotated rectangle, the pixel (or color value) is deemed to match the detectable color.

If the color value of the current pixel matches the detectable color, control passes to step 880. If the color value of the current pixel does not match the detectable color, control passes to step 870.

In step 870, image processor 130 checks whether there are any more pixels of the image frame to be processed. If there are pixels of the image frame to be processed, control passes to step 875 for a next iteration. If there are no more pixels of the image frame to be processed, control passes to step 890.

In step 875, image processor 130 sets the current pixel to the next pixel of the image frame and processing is continued from step 850.

In step 880, image processor 130 adds the pixel as a matching pixel to the respective color mask for the respective illuminant. The color mask is a representation of the match information for a color under an illuminant, described before in section 7. The match information may be shown as a 0 (no match) or 1 (matched). In step 880, image processor 130 sets the value in the color mask for the respective color under the respective illuminant corresponding to the current pixel (for which a match was found in step 860) to a 1. Control then passes to step 870.

In step 890, image processor 130 identifies the closest matching illuminant as the scene illuminant based on the match information of step 880. Such identification can be performed using various well known approaches, once the match information for individual pixels is determined. The flowchart ends in step 899.

It should be appreciated that rotation of a pixel value is avoided when control passes from step 850 to step 870. Accordingly computational requirements may be reduced at least in some circumstances.

It should be appreciated that there are a substantial number of rotations in step 860 above, particularly given that a rotation may need to be performed for each color-potential illuminant combination (assuming a color value falls within the corresponding area of step 850). Such rotations can be avoided by using a histogram approach, in which the frequency count of occurrences of each color candidate (each Kx, Ky combination) is determined, and the counts and other closeness measures related to the corresponding Kx, Ky combination are then examined to determine the actual illuminant.

An aspect of the present invention uses some of the techniques above to reduce computational requirements even in such a context, as described below with an example.

9. One More Example Approach for Reducing Computational Complexity

Figure 10:
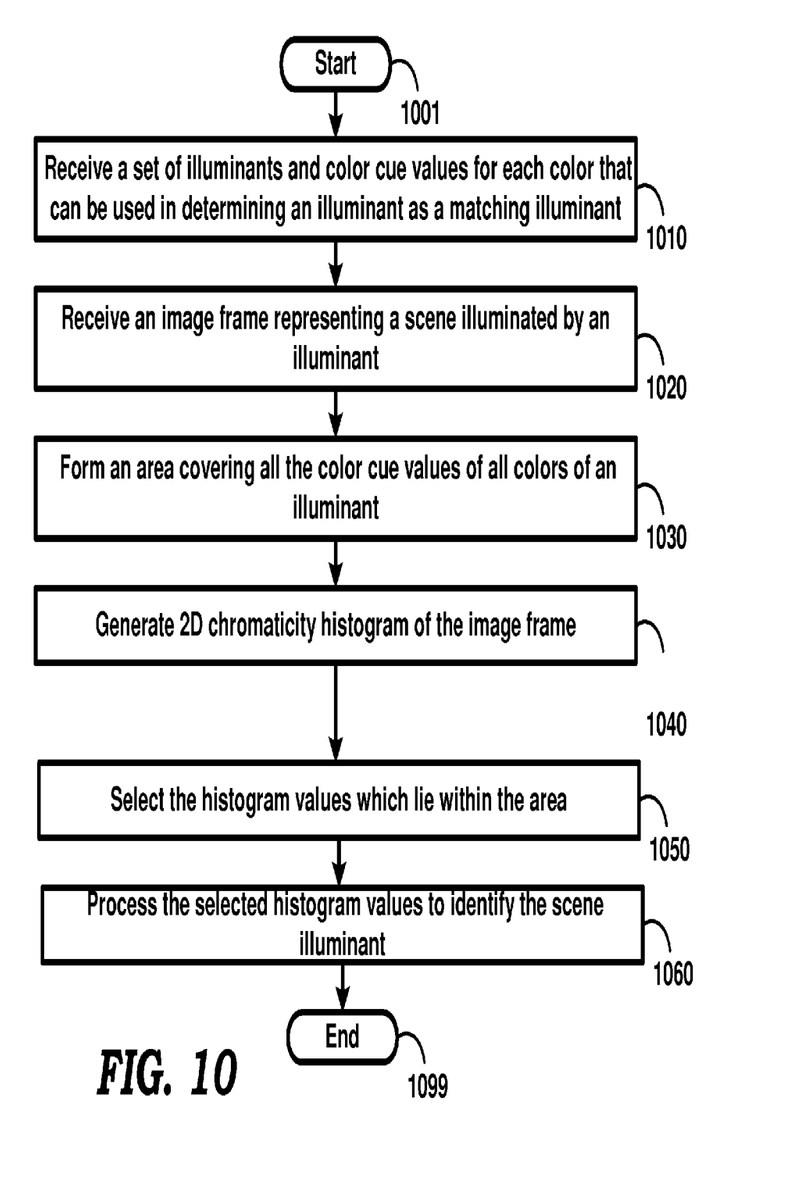
FIG. 10 is a flowchart illustrating the manner in which computational complexity is reduced in using a histogram approach to determine an illuminant of a scene in another embodiment.

FIG. 10 is a flowchart illustrating the manner in which further reduction in the computational complexity in determining an illuminant of a scene is achieved, in an example approach. The description is provided with respect to FIGS. 1-3 and 7-9 merely for illustration. However, various features can be implemented in other environments and other components. Furthermore, the steps are described in a specific sequence merely for illustration.

Alternative embodiments in other environments, using other components, and different sequence of steps can also be implemented without departing from the scope and spirit of several aspects of the present invention, as will be apparent to one skilled in the relevant arts by reading the disclosure provided herein. The flowchart starts in step 1001, in which control passes immediately to step 1010.

Steps 1010, 1020 and 1030 may be performed respectively similar to steps 810, 820 and 830 described above for FIG. 8, and the description is not repeated for conciseness.

In step 1040, image processor 130 generates a 2D chromaticity histogram of the image frame. The 2D chromaticity histogram is created from the chromaticity values in a color space (for example the Kx, Ky color space) and may be logically represented on a three dimensional space, with each point on the X-Y coordinates representing a color candidates (coordinates representing points on the Kx, Ky plane), and counters holding their count (the number of times a color candidate equals the color values in the image frame) on the Z axis.

Figure 11:
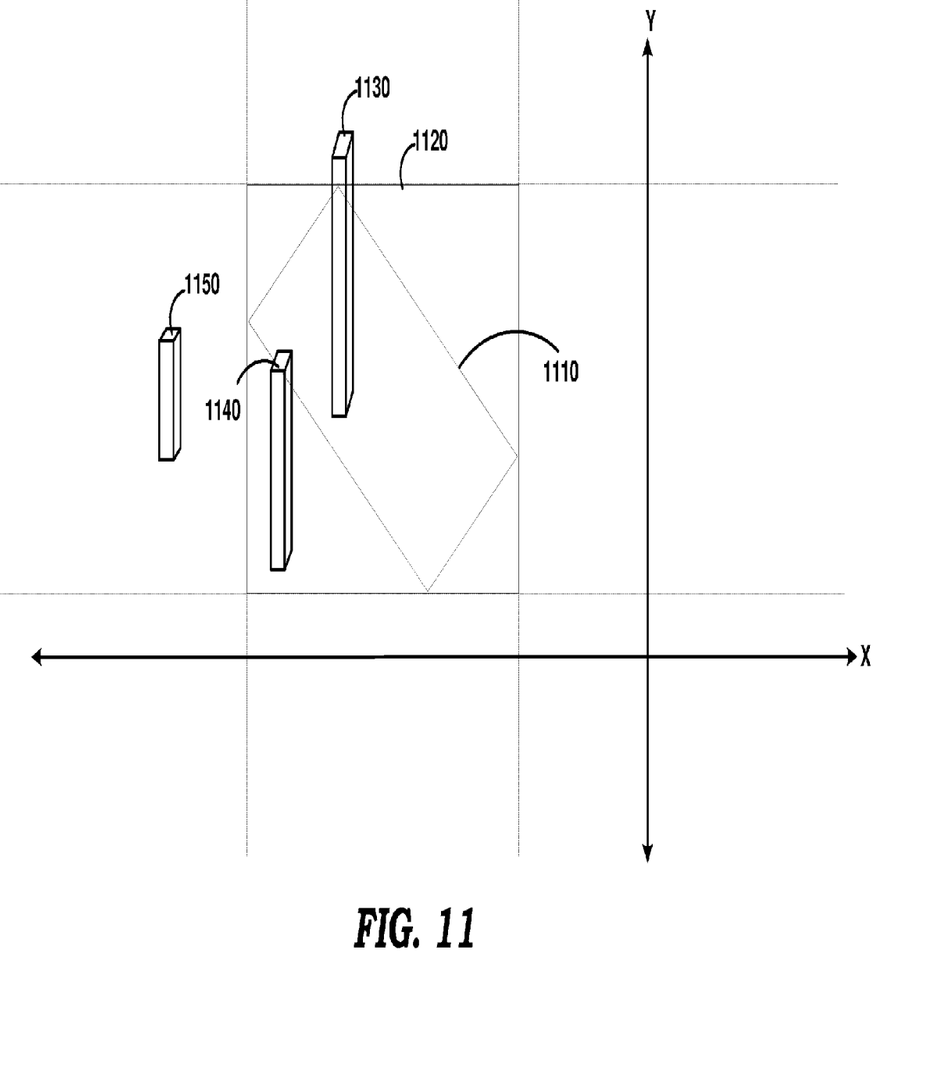
FIG. 11 is a graph illustrating a histogram of various color candidates, with some falling in a cue area and some falling in another larger area formed to cover one or more cue areas in one embodiment.

In step 1050, image processor 130 selects the color candidates (histogram values) which fall within the area formed in step 1030. An example area, formed in the manner described, is shown as area 1120 of FIG. 11. Color candidate 1130 is shown falling in the cue area 1110, color candidate 1140 is shown falling outside the cue area 1110, but inside the formed area 1120 and color candidate 1150 is shown falling outside the formed area 1120. Only three color candidates are shown for illustrative purposes, but counts (0 or positive) would be associated with each color candidate.

In step 1060, image processor 130 processes the selected histogram values to identify the scene illuminant. In an embodiment, the color candidates selected in step 1050 are rotated (while maintaining the associated counts/Z coordinates) so that they align with a coordinate space having axis in parallel to the boundaries of rectangle covering all the color cue values for a detectable color-illuminant combination. It may be appreciated that an aggregate count of the number of pixels matching a detectable color can easily be generated (e.g., using two for loop constructs) from the rotated information since the counters in a rectangle having boundaries which are parallel to the rotated space (X', Y') need to be added. The flowchart ends in step 1099.

The closest matching illuminant can be determined based on such aggregate counts and closeness measures calculated for each detectable color-potential illuminant combination. However, alternative approaches also can be employed in identifying the actual scene illuminant from the histogram information.

Due to the use of the formed area and chromaticity histogram, the number of color candidates that need to be considered and rotated may be reduced while determining an actual illuminant. To further reduce the computational complexity, the flowchart of FIG. 10 can be performed using only a subset of the pixels, as described above with respect to FIGS. 4, and 5A-5E.

It should be appreciated that the flow chart of FIG. 10 can be performed on a subsampled image or the original image received from image sensor array 120. To the extent the histogram is generated from the original image (containing original pixel data), the determination may be more reliable since the fine color information is not lost due to subsampling. However, subsampling implicitly generates a demosaiced and denoised image and reduces the computational requirements, as noted above. Accordingly, in an alternative embodiment, the original image may be subsampled by a small factor (say less than 4, i.e., generating 1 pixel from 4 pixels), and used as an input data to FIG. 10. Chromaticity histogram represents the colors of an original image (which could be of a relatively large size, for e.g. 5 mega pixel image) in a compact form. This compact representation may lead to an efficient determination of an illuminant.

Though described in specific Figures/flowcharts merely for illustration, it should be appreciated that the individual features described above may be combined in different embodiments as suited for the corresponding environments. Such combinations are contemplated to be covered by various features of the present invention.

10. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method of determining a scene illuminant illuminating a scene of interest, said method comprising:
  receiving an image frame and an information, wherein said image frame contains a plurality of color values representing said scene of interest and said information comprises a corresponding plurality of hue values associated with each of a set of colors;
  forming an area, wherein all hue values of said set of colors lie within said area;
  checking whether each of said plurality of color values is in said area; and determining whether a first color value matches a first color only if said first color value is in said area, wherein said first color value is deemed to match said first color only if any of the corresponding hue values equals said first color value, wherein the scene illuminant is determined based on a result of said determining for said plurality of color values including said first color value, wherein said area is a subset of pixels of said image frame that is selected according to a pattern.

2. The method of claim 1, wherein each of said plurality of color values is represented in a two dimensional space having orthogonal axis, wherein said determining transforms said first color value also according to a transformation operation if said first color value is in said area, wherein said transformation operation would rotate said two dimensional space to another two dimensional space in which the corresponding axis would parallel the boundaries of a hue area containing said plurality of hue values.

3. The method of claim 1, wherein said area is a subset of pixels of said image frame that is selected in a specific portion of said image frame.

4. A non-transitory machine readable medium carrying one or more sequences of instructions for causing a system to determine a scene illuminant illuminating a scene of interest, wherein execution of said one or more sequence of instructions by one or more processors contained in said system causes said system to perform the actions of:

receiving an image frame and an information, wherein said image frame contains a plurality of color values representing said scene of interest and said information comprises a corresponding plurality of hue values associated with each of a set of colors;

forming an area, wherein all hue values of said set of colors lie within said area; checking whether each of said plurality of color values is in said area; and determining whether a first color value matches a first color only if said first color value is in said area, wherein said first color value is deemed to match said first color only if any of the corresponding hue values equals said first color value, wherein the scene illuminant is determined based on a result of said determining for said plurality of color values including said first color value, wherein said area is a subset of pixels of said image frame that is selected according to a pattern.

* * * * *